July 3, 1928.

V. O. CORNWELL 1,675,971

APPARATUS FOR FORMING GLASSWARE

Filed Sept. 18, 1925

Virgil O. Cornwell
INVENTOR.

BY
ATTORNEYS.

Patented July 3, 1928.

1,675,971

UNITED STATES PATENT OFFICE.

VIRGIL O. CORNWELL, OF COLUMBUS, OHIO, ASSIGNOR TO THE FEDERAL GLASS COMPANY, OF COLUMBUS, OHIO, A CORPORATION OF OHIO.

APPARATUS FOR FORMING GLASSWARE.

Application filed September 18, 1925. Serial No. 57,179.

My invention relates to apparatus for forming glassware and has to do particularly with the provision of a novel type of mold structure for pressing plastic material such as glass or the like.

In the past, in the manufacture of common pressed tableware and other similar plastic material, it has been the practice to mold such articles in what is known as a block mold. Such block molds are provided in the base thereof with a vertically movable valve. Thus the block mold is shaped to give the exterior contour to the article while the valve structure is designed to form the bottom of the article. In all types of block molds having a movable valve in the base thereof, there is necessarily a small clearance between the valve member and the walls of the block mold in which the valve member works. In this type of construction, the pressure of the forming plunger will invariably cause a portion of the molten glass or other plastic material to enter this space or crack between the valve and the mold wall. When the pressed article is raised by the upward movement of the valve, the glass or other substance that has entered the crack between the valve and mold will remain on the article in the form of a fin or sharp projection. As the valve becomes worn from continued use, this fin on the bottom of the article will become larger. When articles manufactured by this type of mold have been produced with relatively large fins or projections thereon, they are usually rejected as not being salable. However, articles which only have relatively small fins or projections are sold throughout the trade. As is well known by all users of tableware, when the glass article or the like having a rough base caused by fins or small projections is put into use, the surfaces, such as the tops of tables and the like upon which the tumbler rests become scratched or marred.

One of the objects of my invention is the provision of a novel valve structure for use in block molds and depressions on the surface of such valve of such form that a smooth projection is imparted to the article being formed in the mold. As the result of this smooth projection formed upon the base of the glass article or the like, the finished article will present a smooth bottom surface regardless of the size or sharpness of any fins caused by the pressing of plastic material in any necessary cracks in the mold structure.

Another object of the present invention is a molding device of the character described comprising a block mold, means movable relative to the walls of the block mold for forming the base of the article during pressing and for raising the article after pressing, and means for imparting a smooth projection to the base of the article being formed during the pressing operation.

A still further object of the present invention is the provision of block molds having movable valves and means for forming a smooth projection on the base of the article being formed, which smooth projection will be lower than any other part of the base of the article.

Another object of my invention has to do with the provision of a block mold adapted to form a projection or projections upon the bottom of the article being formed, whereby the general bottom of the article will be prevented from contacting with the surface upon which it is to be supported. The result of forming the articles in this manner is to prevent the greater part of the surface of the article, which may be rough or wet, from directly contacting with supporting surfaces.

A further object of my invention is the provision of a valve for a block mold structure, said valve having an annular groove formed in its forming surface for imparting a smooth projection to the base of the article formed.

Various other features of my invention will be apparent as this description progresses and will be brought out in the claims appended thereto. Various objects of my invention are preferably obtained by the structure illustrated in the drawings wherein similar characters of reference designate corresponding parts and wherein:

Figure 1:
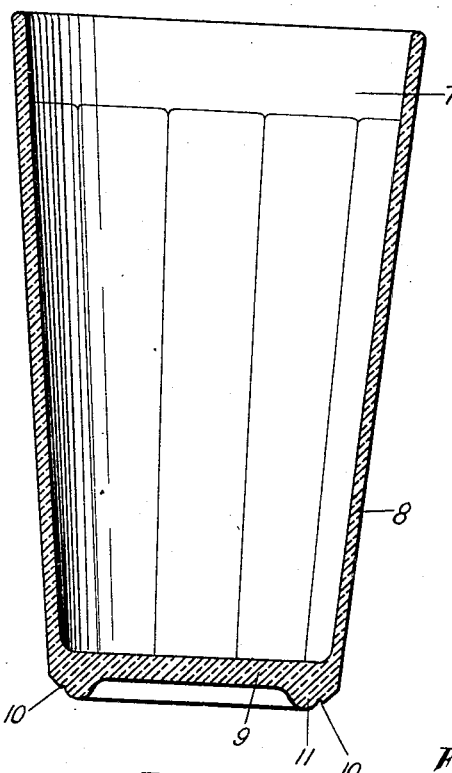
Figure 1 is a vertical longitudinal sectional view of a glass tumbler embodying my invention and showing in particular a smooth projection formed in the base of the tumbler whereby it may be brought into contact with any surface without damage thereto.

In the drawings, I have illustrated a conventional form of block mold such as is utilized in the art today in the manufacture of tableware and other articles of plastic materials, such as molten glass. Probably the greater percentage of all articles made in block molds consists of pressed tumblers, jellies, etc., but it will also be understood that thousands of other articles are also made in block molds.

Figure 3:
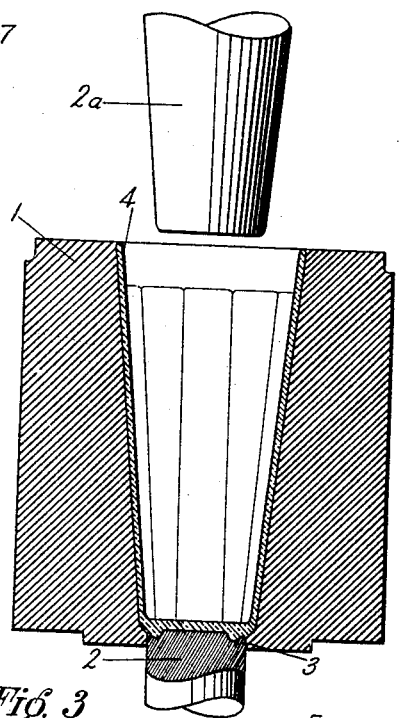
Figure 3 is a vertical sectional view of a conventional block mold consisting of a body portion and a movable valve in the base thereof and also illustrating the formation of an article in such block mold in accordance with my invention.

Figure 3 illustrates a conventional type of block mold comprising a body portion 1 and a valve or plunger structure 2. It will be understood that this block mold may be used in the ordinary glass press wherein the mass of molten glass or other plastic material is deposited in the mold at one position of the table, is then pressed at another position of the table by lowering a plunger 2ª or raising the mold 1, and the pressed article then vertically moved by valve structure 2 at still another position of the table, whereby the article may be readily removed.

Figure 4:
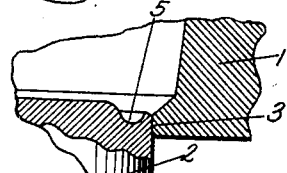
Figure 4 is an enlarged fragmentary detailed view of a part of the bottom portion of the mold shown in Figure 3 and showing in detail the relation between the mold wall and the valve structure and the manner of forming the annular groove in the surface of the valve.

As is obvious from Figures 3 and 4, the valve 2 of the block mold is adapted to move vertically within the main body of the mold and this forms a joint 3 between the cylindrical surface of the valve and the body of the mold. This joint between the valve and the mold bottom must provide sufficient clearance whereby the valve 2 will work freely in the mold bottom. When an article such as the glass tumbler 4, as illustrated in Figure 3, is pressed in such a block mold, the pressure developed by the plunger 2ª entering the block mold is sufficient to cause a part of the glass to enter this joint between the valve and the mold wall.

Referring particularly to Figure 4, the valve 2 for the block mold is shown as being provided in its top or molding surface with an annular groove 5. It is obvious that this groove may be of any shape or size, but as shown in the drawings, it is preferably annular and positioned adjacent to, but spaced from, the joint between the valve and the mold wall. The surface of this annular groove 5 is, of course, machined and made smooth and preferably extends a substantial distance below any other article-forming cavity in the valve or mold wall.

Figure 2:
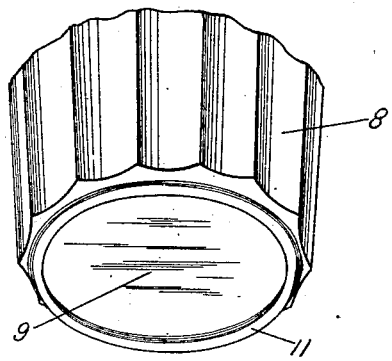
Figure 2 is a fragmentary perspective view illustrating the base of the tumbler shown in Figure 1.

In Figures 1 and 2, I have illustrated a conventional form of glass tumbler formed in accordance with my invention. This tumbler, which may be designated 7, is shown provided with inwardly converging walls 8 and the slightly raised central bottom portion 9. A ridge or fin 10, such as is present in practically all were pressed in block molds, is shown at the base of the tumbler 7. The tumbler is also shown provided with an annular projection or bead 11, which extends below any portion of the base of the tumbler and which presents a perfectly smooth surface to any article or surface with which it may come in contact. This projection 11, regardless of its general shape, is always smooth for the reason that the groove or indentation formed in the valve or mold wall is perfectly smooth and the glass or other plastic substance pressed therein assumes the shape of this groove or indentation without being subject to being pressed in any crease or crevice such as formed by the joint 3 between the valve and mold wall, as best illustrated in Figures 3 and 4.

It will be seen that I have provided a method and apparatus for forming a novel article, such as is illustrated in Figures 1 and 2, whereby the pressed article whether initially formed from plastic glass or other plastic substance, may be placed upon any surface without danger of any damage to such surface. It will also be understood and be obvious to those familiar with the art of pressing ware in block molds that the smooth projections or beads formed upon the base of the article may be of various shapes and sizes and formed in various arrangements and in any number.

It will also be seen that I have provided a novel block mold structure for forming articles pressed from plastic material, which is of very simple and strong construction and which is adapted to form smooth projections or beads on the base of the article simultaneously with the forming of the article, with the result that I am able to produce a finished pressed article, which as far as the base structure is concerned, is always salable and which may be produced at the same production cost as an article formed with an ordinary base in a block mold.

It will further be noted that I have provided an apparatus whereby a smooth projection or bead may be formed on any part of the base of the article simultaneously with the forming of the article. This projection or head is formed by a depression which is always spaced from the joint between the valve and mold body. Thus although it may be common, either for design purposes or other reasons, to form projections in the base of an article at the valve joints, the fins caused by such methods of manufacture may be made unobjectionable by my invention by merely forming a smooth depression or depressions, in old or new block molds, and which depressions are spaced from the valve joint.

Having thus described my invention, what I claim is:

1. In the art of molding in block mold, the combination of a block mold having an integral body, a valve structure in the base of the mold and a depression formed in said valve and spaced from the joint between the valve and mold body for imparting a smooth projection to the base of the article.

2. In the art of molding in block molds, the combination of a block mold having an integral body, a valve structure in the base of the mold and a depression formed in said valve for imparting a smooth projection to the base of the article.

3. Apparatus for forming glassware or the like comprising a block mold, valve structure in the base of said mold and an annular depression formed in said valve and spaced from the edge thereof.

4. Apparatus for forming glassware or the like comprising a block mold, valve structure in the base of said mold and an annular depression formed in said valve.

In testimony whereof I hereby affix my signature.

VIRGIL O. CORNWELL.